(12) United States Patent
Kishima et al.

(10) Patent No.: US 8,710,412 B2
(45) Date of Patent: Apr. 29, 2014

(54) FOCUS INFORMATION GENERATING DEVICE AND FOCUS INFORMATION GENERATING METHOD

(75) Inventors: Koichiro Kishima, Kanagawa (JP); Yu Hirono, Tokyo (JP); Takamichi Yamakoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 402 days.

(21) Appl. No.: 13/255,637

(22) PCT Filed: Mar. 1, 2010

(86) PCT No.: PCT/JP2010/053705
§ 371 (c)(1),
(2), (4) Date: Sep. 16, 2011

(87) PCT Pub. No.: WO2010/106927
PCT Pub. Date: Sep. 23, 2010

(65) Prior Publication Data
US 2011/0315851 A1 Dec. 29, 2011

(30) Foreign Application Priority Data
Mar. 17, 2009 (JP) ................................ 2009-064763

(51) Int. Cl.
*G02B 7/04* (2006.01)
*G02B 27/40* (2006.01)
*G02B 27/64* (2006.01)

(52) U.S. Cl.
USPC ................ 250/201.3; 250/201.4; 250/216; 359/368; 359/383

(58) Field of Classification Search
CPC ............ G02B 21/00; G02B 9/00; G02B 3/14; G02B 3/12; G03B 17/48; G02C 7/08
USPC ........ 250/201.4, 201.3, 201.2, 204, 216, 226; 359/362, 368, 382, 383, 656
See application file for complete search history.

(56) References Cited

U.S. PATENT DOCUMENTS

| 5,317,142 A | 5/1994 | Noda et al. | |
|---|---|---|---|
| 2006/0050402 A1* | 3/2006 | Ito et al. | 359/666 |

(Continued)

FOREIGN PATENT DOCUMENTS

| JP | 5 142462 | 6/1993 |
|---|---|---|
| JP | 2006 292999 | 10/2006 |
| JP | 2007 148084 | 6/2007 |

OTHER PUBLICATIONS

Japanese Office Action Issued Feb. 5, 2013 in Patent Application No. 2009-064763.

(Continued)

*Primary Examiner* — Francis M Legasse, Jr.
(74) *Attorney, Agent, or Firm* — Oblon, Spivak, McClelland, Maier & Neustadt, L.L.P.

(57) ABSTRACT

It is possible to generate image data of a biological tissue in a short time.

A focus information generating device (2) receives a first reflected light beam (Lr1) split from a reflected light beam (Lr) and a second reflected light beam (Lr2) passing through a pin-hole plate (36). A signal processing unit (13) calculates a uniform reflectance (RE) representing a light amount ratio of the second reflected light beam (Lr2) to the first reflected light beam (Lr1) along with a sum signal (SS) and a difference signal (SD). An integrated control unit (11) detects a position (Z1) corresponding to a top surface (104A) of a cover glass (104) on the basis of the sum signal (SS) and the difference signal (SD) and detects a position (Z3) representing a biological tissue (102) on the basis of the sum signal (SS) and the uniform reflectance (RE). As a result, the integrated control unit (11) can calculate a cover distance (DM) from the top surface (104A) of the cover glass (104) to the biological tissue (102) in a pathology glass slide (100) on the basis of the positions (Z1) and (Z3).

14 Claims, 12 Drawing Sheets

(56) References Cited

U.S. PATENT DOCUMENTS

2006/0228107 A1 10/2006 Takamatsu et al.
2011/0102572 A1* 5/2011 Kihara et al. .................... 348/79
2011/0317259 A1* 12/2011 Tanabe et al. ................. 359/383

OTHER PUBLICATIONS

International Search Report issued May 18, 2010 in PCT/JP10/053705 filed Mar. 1, 2010.

* cited by examiner

FIG.2
(A)
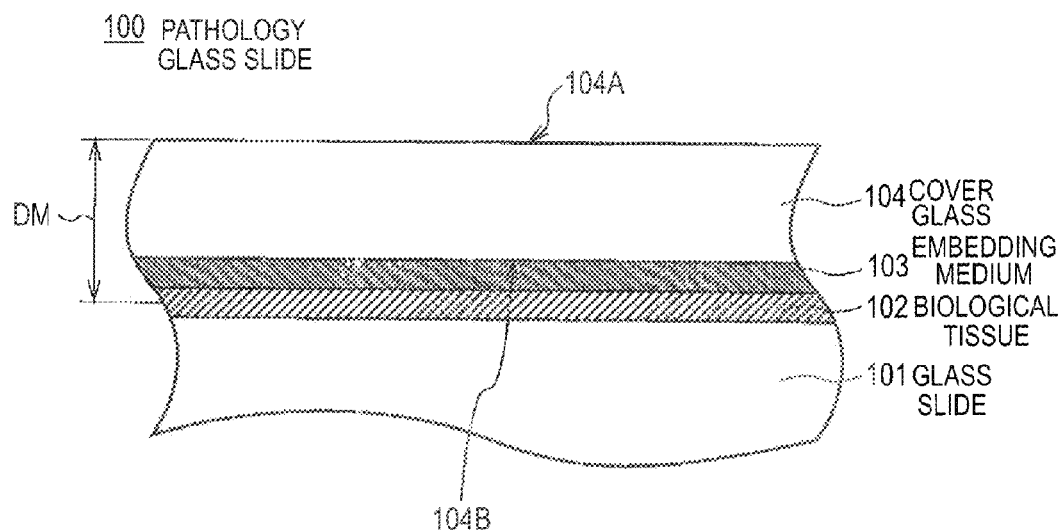
(B)
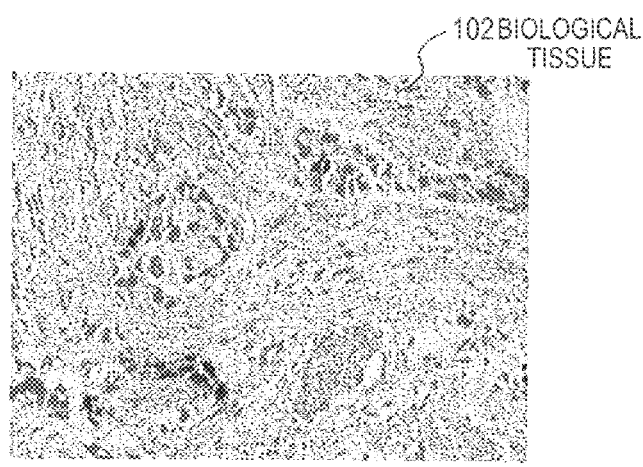

FIG.3
(A)
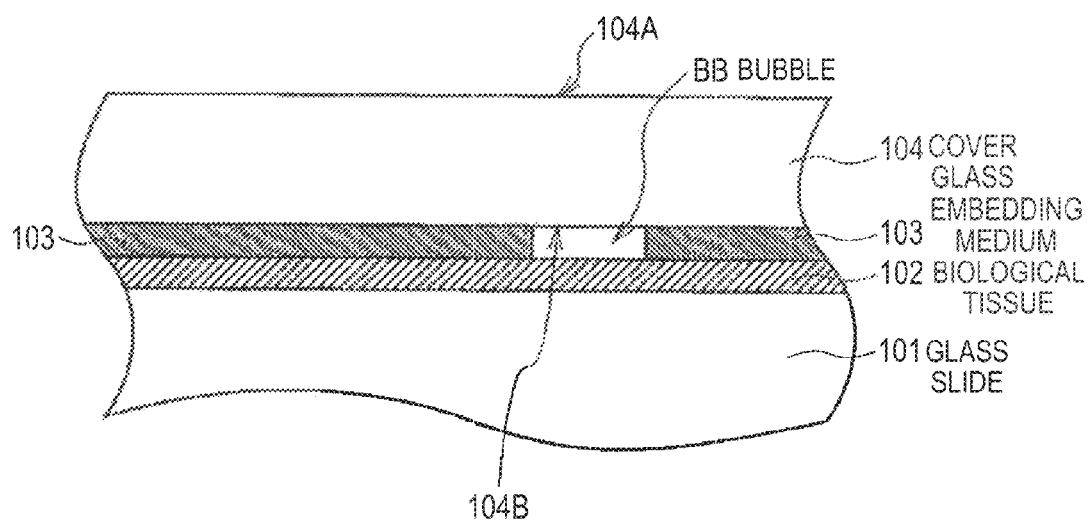
(B)
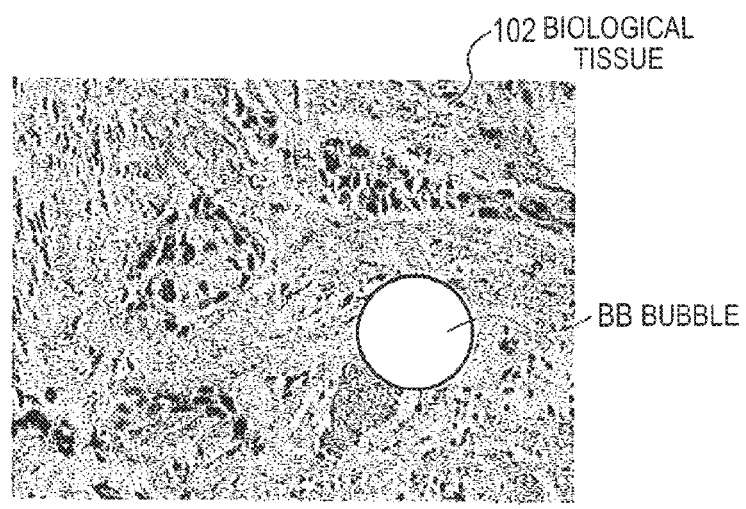

FOCUS INFORMATION GENERATING DEVICE AND FOCUS INFORMATION GENERATING METHOD

TECHNICAL FIELD

The present invention relates to a focus information generating device and a focus information generating method, which can be very suitably used for, for example, a biological tissue imaging system imaging a biological tissue.

BACKGROUND ART

In the past, when a pathological diagnosis was carried out on the basis of a biological tissue, a pathology glass slide in which a biological tissue is fixed onto a glass slide was prepared and a doctor observed the pathology glass slide through the use of a microscope or the like.

In recent years, for the purpose of convenience, a method of generating a biological tissue image by the use of a biological tissue imaging system imaging a biological tissue on a glass slide in advance, displaying the taken image, and allowing a doctor to carry out the pathological diagnosis has been proposed (for example, see PTL 1).

In such a biological tissue imaging system, image data is generally generated by the same imaging principle as a digital camera. In the biological tissue imaging system, a method of setting plural imaging points, sequentially imaging a part of a biological tissue while slightly shifting an imaging range, and combining the taken images is used due to restrictions to the number of pixels of an image sensor or the angle of view of a lens.

CITATION LIST

Patent Literature

[PTL 1] JP-A-2006-292999 (FIG. 1)

SUMMARY OF INVENTION

In the pathology glass slide, a thinly-sliced biological tissue is set on a glass plate, a predetermined embedding medium is applied thereto, and the embedding medium is covered with a cover glass. Here, it is preferable that the thickness of the cover glass or the thickness of the embedding medium is uniform, but it is non-uniform in practice.

Accordingly, in the biological tissue imaging system, so-called focus adjustment of causing a lens to get close to or away from the pathology glass slide for each imaging point and taking the focal point of the lens on the biological tissue is required.

In the biological tissue imaging system, when it takes time to adjust the focus for each imaging point, there is a problem in that much time is required for acquiring image data of the overall biological tissue.

The invention is made in consideration of the above-mentioned problem, and a goal thereof is to provide a focus information generating device and a focus information generating method which can generate image data of a biological tissue in a short time.

To achieve this goal, according to an aspect of the invention, there is provided a focus information generating device including: an objective lens that condenses a light beam emitted from a predetermined light source; a setting stage that has set thereon a pathology glass slide in which a sliced biological tissue is placed on a setting surface of a glass slide and the biological tissue is covered with an embedding medium and a cover glass; a distance adjusting unit that adjusts a distance between the objective lens and the setting stage; a splitting unit that splits a reflected light beam, which is obtained by reflecting the light beam from the pathology glass slide, into a first reflected light beam and a second reflected light beam; a first light-receiving unit that receives the first reflected light beam and generates a first light-reception signal; an irregularly-reflected component removing unit that removes an irregularly-reflected component included in the second reflected light beam; a second light-receiving unit that receives the second reflected light beam passing through the irregularly-reflected component removing unit and generates a second light-reception signal; and a focus information generating unit that calculates a cover distance from the surface of the cover glass to the biological tissue on the basis of the first light-reception signal and the second light-reception signal when the distance between the objective lens and the setting stage is changed and generates focus information of the position irradiated with the light beam on the basis of the cover distance.

In the focus information generating device according to the aspect of the invention, it is possible to specify the position of the biological tissue from the first light-reception signal including the irregularly-reflected component and the second light-reception signal from which the irregularly-reflected component is removed using the fact that a part of the light beam is irregularly reflected from the biological tissue, to calculate the cover distance with high precision, and to generate the focus information. Accordingly, an imaging device can use the focus information without measuring the cover distance by itself and can finish an imaging process in a short time.

According to another aspect of the invention, there is provided a focus information generating method including: a moving step of moving an objective lens, which condenses a light beam emitted from a predetermined light source, along an optical axis of the light beam; a splitting step of splitting a reflected light beam, which is obtained by reflecting the light beam from a pathology glass slide in which a sliced biological tissue is placed on a setting surface of a glass slide and the biological tissue is covered with an embedding medium and a cover glass, into a first reflected light beam and a second reflected light beam; a first light receiving step of receiving the first reflected light beam and generating a first light-reception signal; a second light receiving step of removing an irregularly-reflected component from the second reflected light beam, receiving the second reflected light beam, and generating a second light-reception signal; and a focus information generating step of calculating a cover distance from the surface of the cover glass to the biological tissue on the basis of the first light-reception signal and the second light-reception signal when the objective lens is moved and generating focus information at an applied position of the light beam on the basis of the cover distance.

In the focus information generating method according to the aspect of the invention, it is possible to specify the position of the biological tissue from the first light-reception signal including the irregularly-reflected component and the second light-reception signal from which the irregularly-reflected component is removed using the fact that a part of the light beam is irregularly reflected from the biological tissue, to calculate the cover distance with high precision, and to generate the focus information. Accordingly, an imaging device can use the focus information without measuring the cover distance by itself and can finish an imaging process in a short time.

According to the aspects of the invention, it is possible to specify the position of the biological tissue from the first light-reception signal including the irregularly-reflected component and the second light-reception signal from which the irregularly-reflected component is removed using the fact that a part of the light beam is irregularly reflected from the biological tissue, to calculate the cover distance with high precision, and to generate the focus information. Accordingly, an imaging device can use the focus information without measuring the cover distance by itself and can finish an imaging process in a short time. As a result, the invention can implement a focus information generating device and a focus information generating method which can generate image data of a biological tissue in a short time.

BRIEF DESCRIPTION OF DRAWINGS

FIG. 2 is a diagram schematically illustrating the configuration of the pathology glass slide.

FIG. 3 is a diagram schematically illustrating the configuration of the pathology glass slide.

DESCRIPTION OF EMBODIMENTS

Hereinafter, modes (hereinafter, referred to as embodiments) for putting the invention into practice will be described with reference to the accompanying drawings. The description is made in the following order.
 1. Embodiments (Focus Information Generating Device)
 2. Other Embodiments
1. First Embodiment
1-1. Configuration of Pathology Glass Slide Before describing an imaging system according to the invention, the configuration of a pathology glass slide 100 holding a biological tissue as an imaging target will be described in a preparation procedure with reference to the sectional views in (A) to (C) of FIG. 1.

Figure 1:
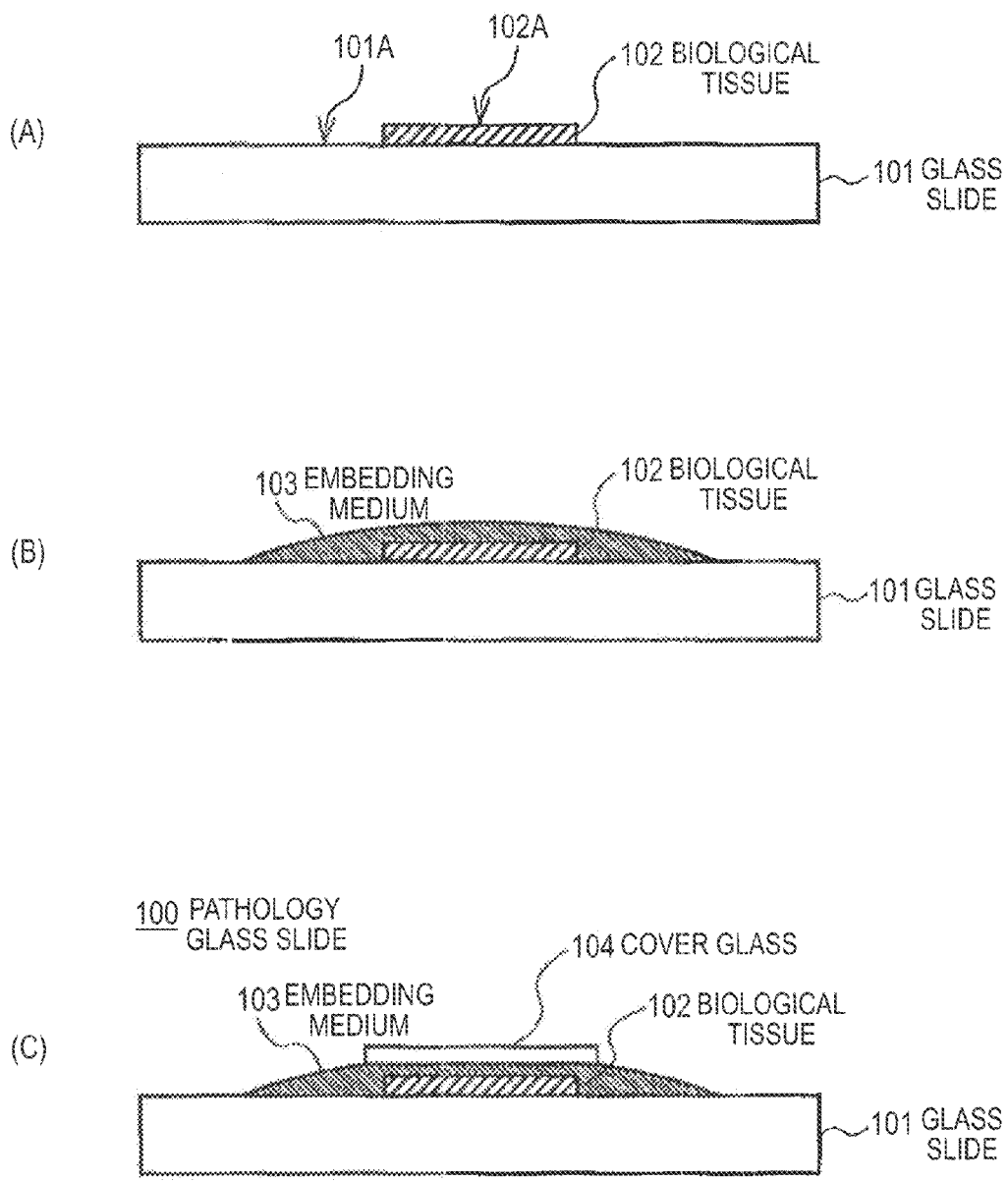
FIG. 1 is a diagram schematically illustrating the configuration of a pathology glass slide.

Actually, in the pathology glass slide 100, a thinly-sliced biological tissue 102 is first spread and placed almost at the center on a setting surface 101A of a glass slide 101 formed of a glass material having a substantially thin plate shape ((A) of FIG. 1).

The glass slide 101 has a length of about 75 [mm] in the horizontal direction in the drawing, a length of about 25 [mm] in the depth direction, and a thickness of about 2 [mm] (that is, the length in the vertical direction in the drawing).

The biological tissue 102 has lengths of about 15 [mm] in the horizontal direction and the depth direction in the drawing and a thickness of about 3 to 5 [μm]. The biological tissue 102 is subjected to a predetermined dying process and it is known that the optical refractive index thereof is in the range of about 1.3 to 1.5. Hereinafter, the top surface of the biological tissue 102 is referred to as an imaging surface 102A.

In the pathology glass slide 100, an embedding medium 103 is applied to the setting surface 101A of the glass slide 101 so as to cover the biological tissue 102 ((B) of FIG. 1) and the resultant is covered with a cover glass 104 so as to cover the biological tissue 102 from the upside ((C) of FIG. 1).

Thereafter, the embedding medium 103 is solidified to fix the biological tissue 102 and the cover glass 104 to the glass slide 101. In this way, the pathology glass slide 100 is prepared.

The cover glass 104 has a length of about 40 [mm] in the horizontal direction in the drawing, a length of about 24 [mm] in the depth direction, and a thickness of about 0.12 to 0.17 [mm].

The embedding medium 103 has a thickness of about 10 [μm] in a state where it is covered with the cover glass 104. Both the optical refractive indices of the embedding medium 103 and the cover glass 104 are about 1.5.

In the pathology glass slide 100, a space between the biological tissue 102 and the cover glass 104 is ideally filled with the embedding medium 103, as shown in (A) of FIG. 2 which is a partially enlarged view of (C) of FIG. 1.

As shown in the top view of (B) of FIG. 2 corresponding to (A) of FIG. 2, the pathology glass slide 100 is in a state where the biological tissue 102 can be observed through the cover glass 104 and the embedding medium 103 (both of which are not shown).

However, in the actual pathology glass slide 100, a bubble BB may be included in the embedding medium 103, as shown in the sectional view of (A) of FIG. 3 corresponding to (A) of FIG. 2.

At this time, in the pathology glass slide 100, gas such as air instead of the embedding medium 103 occupies the space between the biological tissue 102 and the cover glass 104 in the part including the bubble BB.

Here, the refractive index of the embedding medium 103 is about 1.5 and the refractive index of the bubble BB is about 1. Accordingly, it is thought that light is refracted at the boundary between the embedding medium 103 and the bubble BB. As a result, when the pathology glass slide 100 is seen from the top, the position at which the bubble BB is present is different in visibility from the position at which the bubble BB is not present, as shown in (B) of FIG. 3 corresponding to (B) of FIG. 2.

In this way, the pathology glass slide 100 has a configuration in which the biological tissue 102 is covered with the cover glass 104 on the setting surface 101A of the glass slide 101 with the embedding medium 103 interposed therebetween. A bubble BB may be included in the embedding medium 103.
1-2. Configuration of Imaging System An imaging system 1 imaging the pathology glass slide 100 and generating imaging data will be described below.

Figure 4:
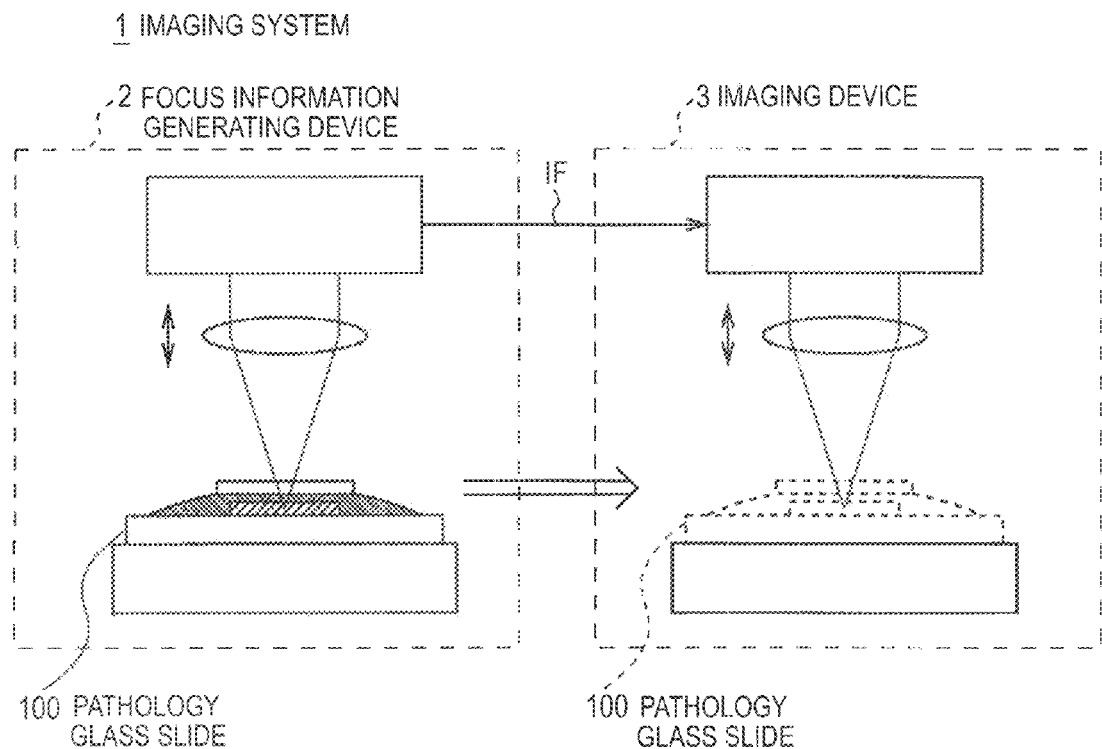
FIG. 4 is a block diagram schematically illustrating the configuration of an imaging system.

The imaging system 1 includes a combination of a focus information generating device 2 and an imaging device 3 as shown in FIG. 4.

The imaging device 3 takes a focus on the biological tissue 102 and images the biological tissue. However, a range which can be imaged by one imaging process is narrower than an imaging range 102AR ((B) of FIG. 2) of the biological tissue 102 due to the restrictions to an image sensor or the like.

Figure 5:
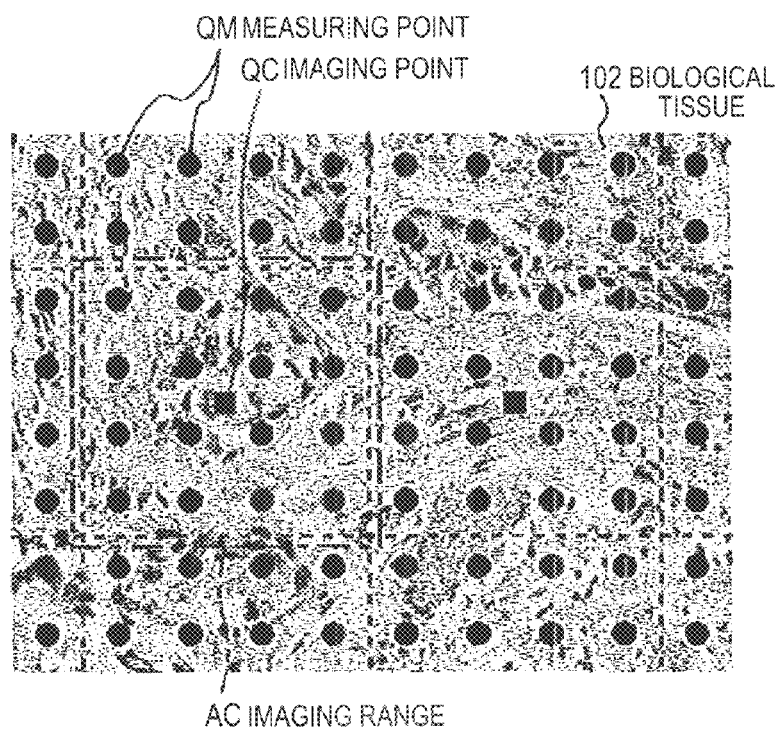
FIG. 5 is a diagram schematically illustrating the setting of measuring points and imaging points.

Accordingly, in the imaging system 1, as shown in FIG. 5, plural imaging points QC (indicated by black rectangular marks in the drawing) arranged at constant intervals are set on the pathology glass slide 100. The imaging points QC are determined on the basis of one imaging range AC in the imaging device 3 so that the adjacent imaging ranges AC slightly overlap with each other.

In the imaging system 1, measuring points QM (indicated by black circular marks in the drawing) are set on the pathology glass slide 100 at intervals smaller than the imaging points QC.

In the pathology glass slide 100, for example, the imaging ranges AC each have about 1 [mm] square, the imaging points QC are arranged at the interval of about 1 [mm], and the measuring points QM are arranged at the interval of about 250 [μm].

The focus information generating device 2 detects the distance (hereinafter, referred to as cover distance DM) from the top surface 104A of the cover glass 104 to the biological tissue 102 for each measuring point QM, before imaging the biological tissue 102. At this time, the focus information generating device 2 generates focus information IF by correlating the cover distances DM with information representing the measuring points QM and supplies the focus information to the imaging device 3.

The cover distance DM represents a distance to the biological tissue 102 using the top surface 104A which is the upside surface of the cover glass 104 as a reference point.

Accordingly, the imaging device 3 generates focus information for each imaging point QC on the basis of the focus information IF for each measuring point QM, takes a focus on the biological tissue 102 for each imaging point QC, and generates taken images PC.

Thereafter, the imaging device 3 generates a biological tissue image PR representing the overall biological tissue 102 by connecting and combining the plural taken images PC.

In this way, the imaging system 1 generates the focus information IF representing the cover distance DM for each measuring point QM by the use of the focus information generating device 2 and takes a focus on and takes an image of the biological tissue 102 for each imaging point QC on the basis of the focus information IF by the use of the imaging device 3.

1-3. Configuration of Focus Information Generating Device

Figure 6:
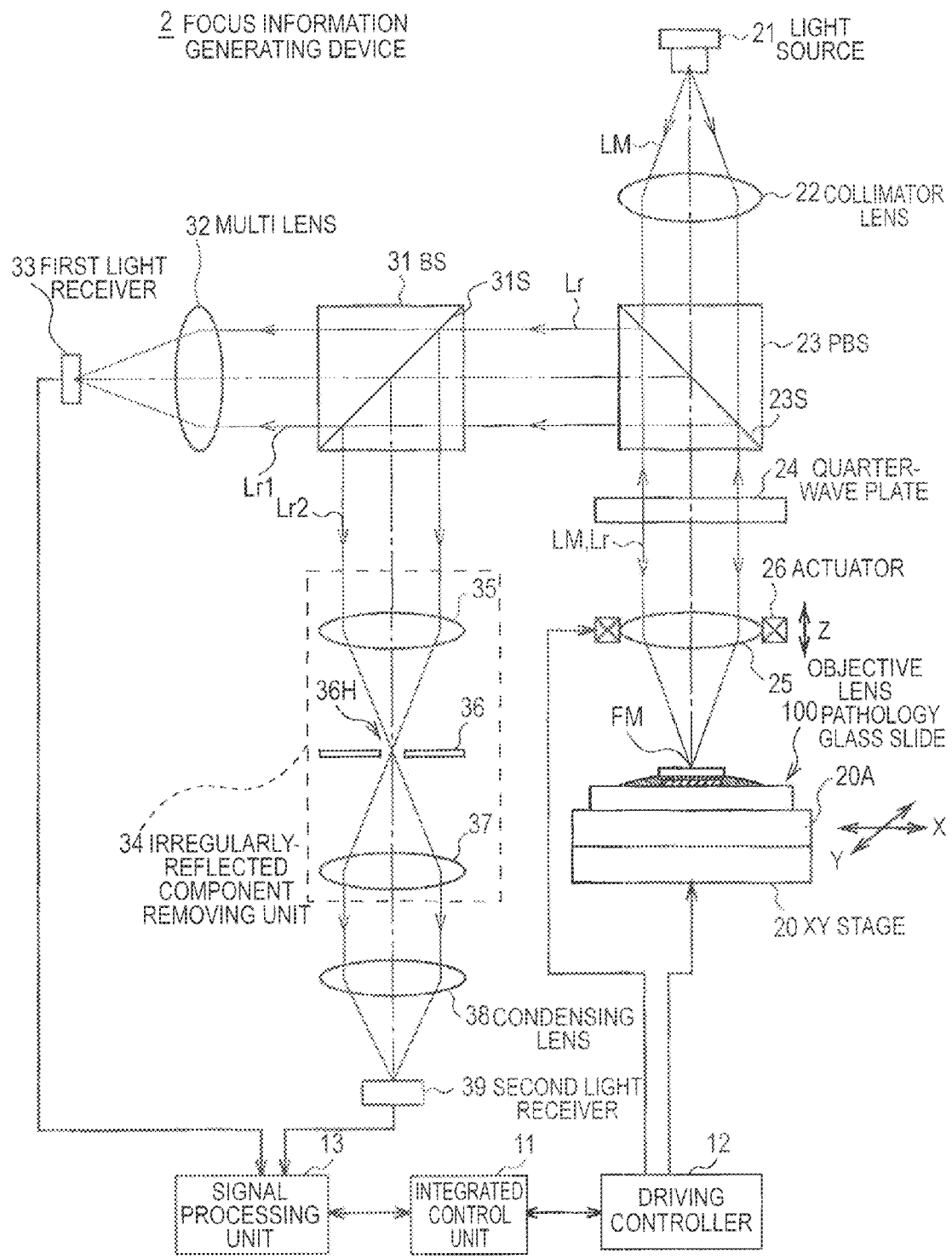
FIG. 6 is a diagram schematically illustrating the configuration of a focus information generating device.

The focus information generating device 2 comprehensively controls the overall parts by the use of an integrated control unit 11, as shown in FIG. 6.

The integrated control unit 11 includes a CPU (Central Processing Unit) not shown, a ROM (Read Only Memory) storing various programs, and a RAM (Random Access Memory) used as a work memory of the CPU.

When generating the focus information IF, the integrated control unit 11 emits a light beam LM including diverging light of a predetermined wavelength from a light source 21 including a laser diode or the like, converts the light beam into parallel light by the use of a collimator lens 22, and allows the parallel light to be incident on a polarizing beam splitter (PBS) 23.

The polarizing beam splitter 23 transmits almost all the P-polarized light beam and reflects almost all the S-polarized light beam, by the use of a reflective and transmissive surface 23S varying in transmittance depending on the polarization direction of light.

Actually, the polarizing beam splitter 23 transmits almost all the light beam LM through the use of the reflective and transmissive surface 23S and applies the light beam to a quarter-wave plate 24.

The quarter-wave plate 24 can mutually change light between linearly-polarized light and circularly-polarized light, converts, for example, a light beam LM of P-polarized light into a left-handed circularly-polarized light beam, and applies the left-handed circularly-polarized light beam to an objective lens 25.

The objective lens 25 condenses the light beam LM and applies the condensed light beam to the pathology glass slide 100. Under the control of the integrated control unit 11 and a driving controller 12, the objective lens 25 is moved in a direction (hereinafter, referred to as the Z direction) along the optical axis of the light beam LM by an actuator 26 and the focal point FM of the light beam LM can be accordingly moved in the Z direction.

An XY stage 20 can move a predetermined movable stage 20A in the right-left direction (hereinafter, referred to as the X direction) and front-rear direction (hereinafter, referred to as the Y direction) in a state where the pathology glass slide 100 is fixed to the movable stage 20A.

Actually, the integrated control unit 11 has measuring point position information corresponding to the positions of the measuring points QM and supplies the information to the driving controller 12. Accordingly, the driving controller 12 moves the movable stage 20A to which the pathology glass slide 100 is fixed in the X direction and the Y direction by generating a position control signal on the basis of the measuring point position information and supplying the generated position control signal to the XY stage 20.

As a result, the XY stage 20 can match the optical axis (indicated by a one-dot chained line in the drawing) of the light beam LM with the measuring points QM on the pathology glass slide 100.

The light beam LM is reflected from the pathology glass slide 100 and is changed to a reflected light beam Lr. Since the reflected light beam Lr is reversed in the rotation direction of the circularly-polarized light, the reflected light beam is a right-handed circularly-polarized light beam. The reflected light beam Lr travels in the opposite direction of the light beam LM, is converted into parallel light by the objective lens 25, and is incident on the quarter-wave plate 24.

The quarter-wave plate 24 converts the reflected light beam Lr as the right-handed circularly-polarized light beam into an S-polarized light beam (that is, a linearly-polarized light beam) and applies the S-polarized light beam to the polarizing beam splitter 23.

The polarizing beam splitter 23 reflects almost all the reflected light beam Lr as the S-polarized light beam from the reflective and transmissive surface 23S and applies the reflected light beam to a beam splitter (BS) 31.

The beam splitter 31 transmits about a half of a light beam and reflects the other half of the light beam through the use of a reflective and transmissive surface 31S. Actually, the beam splitter 31 transmits about a half of the reflected light beam Lr as a first reflected light beam Lr1 and applies the first reflected light beam to a multi lens 32.

The multi lens 32 condenses the first reflected light beam Lr1, gives astigmatism to the first reflected light beam, and applies the first reflected light beam to a first light receiver 33.

Figure 7:
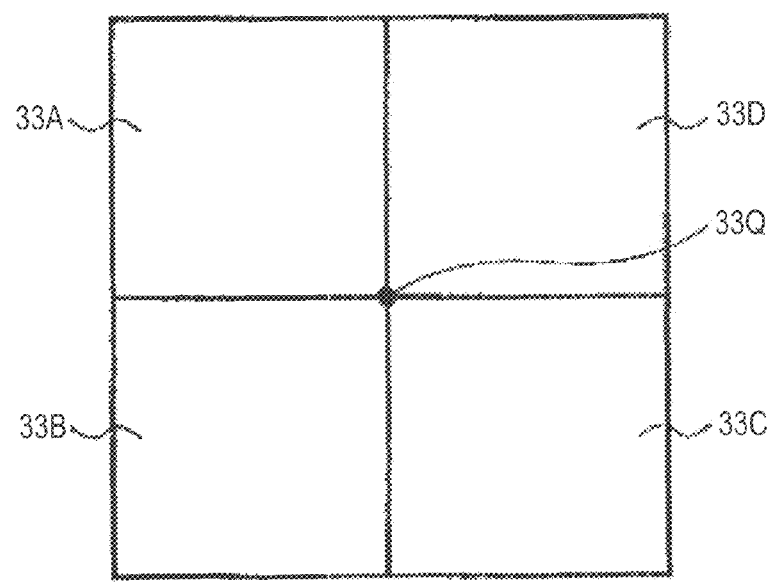
FIG. 7 is a diagram schematically illustrating the configuration of a first light receiver.

The first light receiver 33 includes four light-receiving areas 33A, 33B, 33C, and 33D arranged in a lattice pattern as shown in FIG. 7, and the attachment position thereof and the like is adjusted so that the optical axis of the first reflected light beam Lr1 is located at the center point 33Q thereof.

The first light receiver 33 receives parts of the first reflected light beam Lr1 by the use of the light-receiving areas 33A, 33B, 33C, and 33D, generates first light-reception signals S1A, S1B, S1C, and S1D corresponding to the amounts of light received, and supplies the generated first light-reception signals to a signal processing unit 13.

The beam splitter 31 reflects about a half of the reflected light beam Lr as a second reflected light beam Lr2 and applies the second reflected light beam to an irregularly-reflected component removing unit 34.

The irregularly-reflected component removing unit 34 includes a condensing lens 35, a pin-hole plate 36, and a collimator lens 37.

The condensing lens 35 condenses the second reflected light beam Lr2 and applies the condensed light beam to the pin-hole plate 36. In the pin-hole plate 36, a minute through-hole 36H centered on the optical axis of the second reflected light beam Lr2 is formed in the vicinity of the focal point of the second reflected light beam Lr2.

The second reflected light beam Lr2 is condensed by the condensing lens 35, passes through the through-hole 36H of the pin-hole plate 36, and is incident as diverging light on the collimator lens 37. At this time, a part of the second reflected light beam Lr2, which is condensed by the condensing lens 35, other than a part close to the focal point is blocked by the pin-hole plate 36.

The collimator lens 37 converts the second reflected light beam Lr2 into a parallel light beam and inputs the parallel light beam to the condensing lens 38. The condensing lens 38 condenses and inputs the second reflected light beam Lr2 to a second light receiver 39.

The second light receiver 39 generates a second light-reception signal S2 corresponding to the amount of light of the second reflected light beam Lr2 and supplies the second light-reception signal to the signal processing unit 13.

The signal processing unit 13 generates focus information IF at the measuring point QM by performing a focus information generating process to be described later.

In this way, the focus information generating device 2 matches the optical axis of the light beam LM with the measuring point QM, applies the light beam to the pathology glass slide 100, and splits the reflected light beam Lr thereof into the first reflected light beam Lr1 and the second reflected light beam Lr2. Thereafter, the focus information generating device receives the first reflected light beam Lr1 with the astigmatism given to the first reflected light beam and receives the second reflected light beam Lr2 after passing the second reflected light beam through the through-hole 36H of the pin-hole plate 36.

1-4. Generation of Focus Information

The generation of the focus information IF at each measuring point QM will be described below.

1-4-1. Relationship between Waveforms of Signals and Focal Point of Light Beam

The integrated control unit 11 controls the first light receiver 33 and the second light receiver 39 to generate the first light-reception signals S1A to S1D and S2 and controls the actuator 26 to move the objective lens 25 at a constant speed in the Z direction so as to get close to the pathology glass slide 100 from a distal place.

At this time, the signal processing unit 13 generates a sum signal SS through the use of Expression 1 on the basis of the first light-reception signals S1A to S1D generated by the first light receiver 33 and supplies the sum signal to the integrated control unit 11. The sum signal SS represents the total light amount of the first reflected light beam Lr1.

$$SS = S1A + S1B + S1C + S1D \qquad \text{Expression 1}$$

Here, as shown in (A) and (B) of FIG. 2, it is assumed that a bubble BB is not included in the embedding medium 103. At this time, the value of the sum signal SS varies depending on the position of the objective lens 25 in the Z direction, as shown in (A) of FIG. 8.

Here, the actuator 26 moves the objective lens 25 at a constant speed. Accordingly, the horizontal axis in FIG. 8 represents the time and also represents the relative position of the objective lens 25 in the Z direction, that is, the relative position of the focal point FM in the Z direction.

Figure 8:
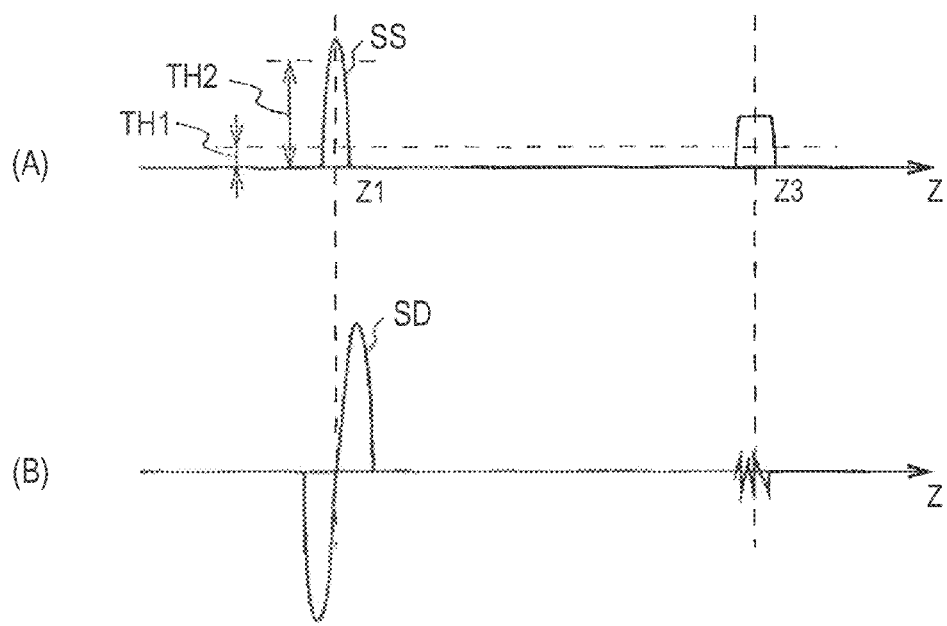
FIG. 8 is a diagram schematically illustrating a signal waveform when an objective lens is moved in the Z direction.

As can be seen from (A) of FIG. 8, the sum signal SS forms a peak waveform of a relatively high signal level centered on position Z1 and forms a peak waveform of an intermediate signal level centered on position Z3.

The peaks in the sum signal SS represents that the light beam LM is reflected at a relatively high reflectance, that is, that the focal point FM of the light beam LM is located on the boundary between two materials having different refractive indices.

In the pathology glass slide 100, the refractive index (about 1.5) of the cover glass 104 is greatly different from the refractive index (about 1) of air present around the top surface 104A. Accordingly, the peak of the sum signal SS centered on position Z1 represents that the focal point FM of the light beam LM is located on the top surface 104A of the cover glass 104.

The peak centered on position Z3 represents that the light beam LM is reflected at a relatively low reflectance. That is, this peak represents that the focal point FM of the light beam LM is located in a material having a relatively low transmittance and reflecting a part thereof, that is, in the biological tissue 102.

In addition, the refractive indices of the cover glass 104 and the embedding medium 103 are both about 1.5. Accordingly, most of the light beam LM is not reflected from the boundary between the cover glass 104 and the embedding medium 103.

In this way, a large peak appears in the sum signal SS, when the objective lens 25 is located at position Z1 and the focal point FM of the light beam LM is located on the top surface 104A of the cover glass 104. An intermediate peak appears in the sum signal SS, when the objective lens 25 is located at position Z3 and the focal point FM is located in the biological tissue 102.

The signal processing unit 13 generates a difference signal SD as a diagonal difference value between the values, obtained by summing the light-reception signals of the light-receiving areas arranged in a diagonal in the first light receiver 33, through the use of Expression 2 and supplies the generated difference signal to the integrated control unit 11.

$$SD = (S1A + S1C) - (S1B + S1D) \qquad \text{Expression 2}$$

In Expression 2, the difference signal SD is calculated by the use of the same calculation principle as a focus error signal based on an astigmatic method in an optical disk device.

The value of the difference signal SD varies depending on the position of the objective lens 25 in the Z direction, similarly to the sum signal SS, as shown in (B) of FIG. 8 corresponding to (A) of FIG. 8.

As can be seen from (B) of FIG. 8, the difference signal SD forms an S-shaped curve in which positive and negative peaks of a relatively high signal level centered on position Z1 continuously appear.

The negative peak and the positive peak appear in the S-shaped curve of the difference signal SD with position Z1 interposed therebetween, and the value at position Z1 is "0". This represents that the focal point FM of the light beam LM is located on the top surface 104A of the cover glass 104 when the objective lens 25 is located at position Z1.

The value of the difference signal SD varies in the vicinity of position Z3. This represents that the light beam LM is randomly reflected at a relatively low reflectance. At this time, it is though that the focal point FM of the light beam LM is located in a material having a relatively low transmittance and reflecting a part thereof, that is, in the biological tissue 102.

Accordingly, position Z1 in the difference signal SD means that the focal point FM is located on the top surface 104A of the cover glass 104 and position Z3 means that the focal point FM is located in the biological tissue 102.

In this way, when a bubble BB is not included in the embedding medium 103, the integrated control unit 11 can determine position Z1, that is, the position of the top surface 104A of the cover glass 104, from the peak waveform in the sum signal SS or the S-shaped curve in the difference signal SD.

Specifically, the integrated control unit 11 can determine position Z1, for example, when the sum signal SS is greater than a predetermined threshold value TH1 ((A) of FIG. 8) or when the S-shaped curve is first formed in the difference signal SD.

The integrated control unit 11 can determine position Z3, that is, the position of the biological tissue 102, from the intermediate peak waveform in the sum signal SS or the variation in value in the difference signal SD.

As a result, the integrated control unit 11 can calculate the cover distance DM from the top surface 104A of the cover glass 104 to the biological tissue 102 in the pathology glass slide 100 from the distance of positions Z1 and Z3 of the objective lens 25, when a bubble BB is not present.

1-4-2. Waveforms of Signals when Bubble is Included

Figure 9:
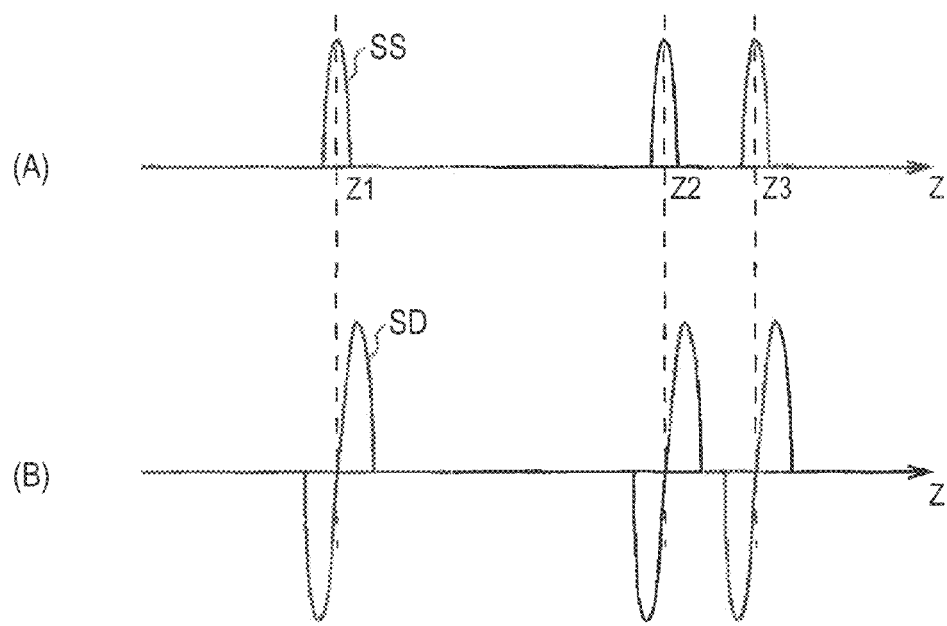
FIG. 9 is a diagram schematically illustrating a signal waveform when the objective lens is moved in the Z direction.

On the other hand, when a bubble BB is included in the embedding medium 103 ((A) and (B) of FIG. 3), the waveforms of the sum signal SS and the difference signal SD have shapes different from those in the case where the bubble BB is not included, as shown in (A) and (B) of FIG. 9 corresponding to (A) and (B) of FIG. 8.

The sum signal SS in (A) of FIG. 9 has the same waveform as shown in (A) of FIG. 8 in the vicinity of position Z1. However, in the vicinity of position Z2, the sum signal SS forms the same waveform as the waveform in the vicinity of position Z1, unlike (A) of FIG. 8. In the vicinity of position Z3, the sum signal forms a peak waveform slightly smaller than the peak waveform in the vicinity of position Z1.

It is thought that the peak formed in the vicinity of position Z2 results from the boundary between the bottom surface 104B of the cover glass 104 and the bubble BB ((A) of FIG. 3). It is thought that the peak formed in the vicinity of position Z3 results from the boundary between the bubble BB and the biological tissue 102.

That is, when the bubble BB is included in the embedding medium 103, the peak, which does not appear when the bubble BB is not included, appears at positions Z2 and Z3 in the sum signal SS.

The waveform of the difference signal SD in (B) of FIG. 9 is the same as shown in (B) of FIG. 8 in the vicinity of position Z1. However, in the vicinity of positions Z2 and Z3, the waveform of the difference signal SD forms the same S-shaped curve as in the vicinity of position Z1, unlike (B) of FIG. 8.

That is, when the bubble BB is included in the embedding medium 103, an S-shaped curve, which does not appear when the bubble BB is not included, appears at positions Z2 and Z3 in the difference signal SD.

In this way, when the bubble BB is included in the embedding medium 103, the integrated control unit 11 cannot determine position Z3, that is, the position of the biological tissue 102, from the sum signal SS and the difference signal SD in the same way as when the bubble is not included. Accordingly, the integrated control unit 11 cannot calculate the cover distance DM.

1-4-3. Determination Process Using Second Light-reception Signal

In the focus information generating device 2, when the light beam LM is reflected by a uniform surface such as the top surface 104A or the bottom surface 104B of the cover glass 104, the light beam LM is almost uniformly reflected. Accordingly, the reflected light beam Lr hardly includes irregularly-reflected components.

In the focus information generating device 2, the beam splitter 31 splits the reflected light beam Lr into the first reflected light beam Lr1 and the second reflected light beam Lr2 so as to divide the amount of light of the reflected light beam into almost two halves. Accordingly, the amounts of light of the first reflected light beam Lr1 and the second reflected light beam Lr2 just after they are emitted from the beam splitter 31 are almost equal to each other.

When the second reflected light beam Lr2 is condensed by the condensing lens 35, it hardly includes the irregularly-reflected component and thus almost all the components are condensed on the focal point. Accordingly, the second reflected light beam Lr2 passes through the through-hole of the pin-hole plate 36 without being blocking.

As a result, the amount of light of the second reflected light beam Lr2 reaching the second light receiver 39 is substantially equal to the amount of light of the first reflected light beam Lr1 reaching the first light receiver 33.

On the other hand, the biological tissue 102 irregularly reflects a part of the light beam LM, since the structures such as cells included in the biological tissue 102 are not uniform.

Therefore, the reflected light beam Lr reflected by the biological tissue 102 includes the irregularly-reflected components. The beam splitter 31 splits the reflected light beam Lr including the irregularly-reflected components into the first reflected light beam Lr1 and the second reflected light beam Lr2. That is, the first reflected light beam Lr1 and the second reflected light beam Lr2 include the irregularly-reflected components.

The first light receiver 33 receives the first reflected light beam Lr1 including the irregularly-reflected components without attenuating or blocking the first reflected light beam Lr1 in the midway.

On the other hand, when the second reflected light beam Lr2 is condensed by the condensing lens 35, the irregularly-reflected components included therein are condensed to some extent, but are not necessarily condensed on the vicinity of the focal point. Accordingly, the irregularly-reflected components of the second reflected light beam Lr2 are blocked by the pin-hole plate 36 of the irregularly-reflected component removing unit 34.

As a result, the second reflected light beam Lr2 reaching the second light receiver 39 does not include the irregularly-reflected components. Accordingly, the amount of light of the second reflected light beam Lr2 reaching the second light receiver 39 is smaller than the amount of light of the first reflected light beam Lr1 reaching the first light receiver 33.

Figure 10:
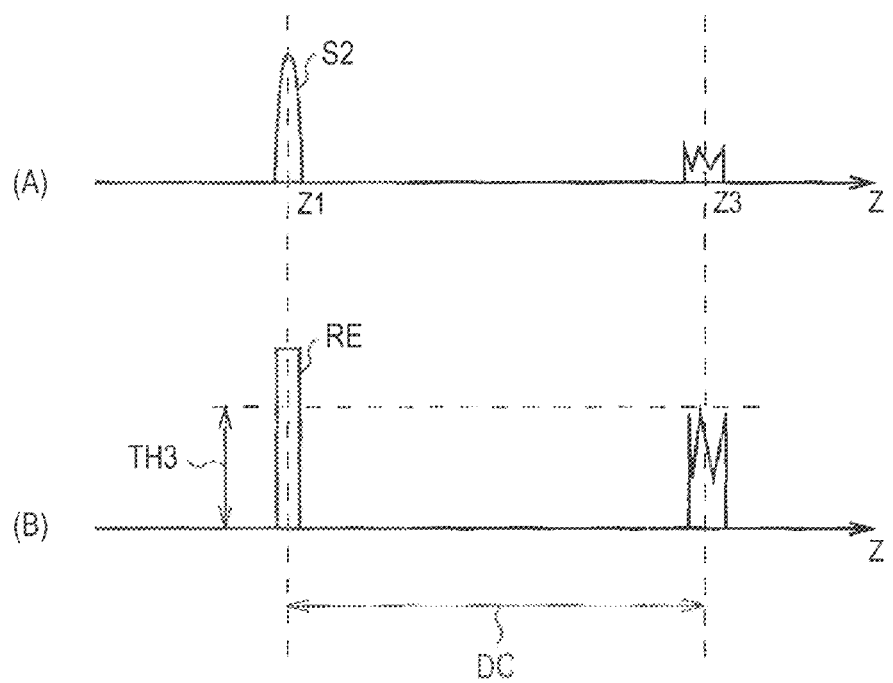
FIG. 10 is a diagram schematically illustrating a signal waveform when the objective lens is moved in the Z direction.

Accordingly, when the objective lens 25 is moved to get close to the pathology glass slide 100, in which the embedding medium 103 does not include a bubble BB, in the Z direction, the second light-reception signal S2 generated by the second light receiver 39 has the same signal waveform as shown in (A) of FIG. 10 corresponding to (A) of FIG. 8.

In (A) of FIG. 10, the second light-reception signal S2 forms a peak waveform, centered on position Z1, of the same signal level as shown in (A) of FIG. 8 and also forms a small peak waveform, centered on position Z3, of a signal level lower than that in (A) of FIG. 8.

That is, when the objective lens 25 is located at position Z1, the focal point FM of the light beam LM is located on the top surface 104A of the cover glass 104 and thus the reflected light beam Lr hardly includes the irregularly-reflected components. Accordingly, the second light-reception signal S2 has almost the same level as the sum signal SS.

When the objective lens 25 is located at position Z3, the focal point FM of the light beam LM is located in the biological tissue 102 and the reflected light beam Lr includes the irregularly-reflected components to some extent. Accordingly, the second light-reception signal S2 has a signal level lower than that of the sum signal SS.

On the contrary, when a bubble BB is included in the embedding medium 103 and the objective lens 25 is located at one of positions Z1, Z2, and Z3, the focal point FM of the light beam LM is located at the boundary between two types of materials. Accordingly, the reflected light beam Lr hardly includes the irregularly-reflected components.

Therefore, the second light-reception signal S2 shows almost the same waveform as the sum signal SS shown in (A) of FIG. 9.

Here, the value obtained by dividing the second light-reception signal S2 by the sum signal SS represents a ratio of components (referred to as regularly-reflected components) other than the irregularly-reflected components in the reflected light beam Lr. Hereinafter, this ratio is referred to as a uniform reflectance RE.

Actually, the signal processing unit 13 calculates the uniform reflectance RE by the use of Expression 3 and supplies the calculated uniform reflectance to the integrated control unit 11.

$$RE = S2/SS \quad \text{Expression 3}$$

As shown in (B) of FIG. 10, this uniform reflectance RE exhibits a relatively high value when the light beam LM is reflected by a uniform boundary, and exhibits a relatively low value when a part of the light beam LM is irregularly reflected, that is, when the focal point FM of the light beam LM is located in the biological tissue 102.

On the basis of the above-mentioned fact, the integrated control unit 11 determines that the focal point FM of the light beam LM is located in the biological tissue 102 when the sum signal SS is greater than a predetermined threshold value TH2 ((A) of FIG. 8) and the uniform reflectance RE is smaller than a predetermined threshold value TH3 ((B) of FIG. 10). The threshold values TH2 and TH3 are appropriately determined on the basis of experiment results and the like.

Accordingly, even when the bubble BB is included in the embedding medium 103, the integrated control unit 11 can determine position Z3 at which the focal point FM of the light beam LM is located in the biological tissue 102 without being affected by the variation of the sum signal SS and the like due to the boundary of the bubble.

As described above, the integrated control unit 11 can determine position Z1, that is, the position of the top surface 104A of the cover glass 104, from the peak waveform in the sum signal SS or the second light-reception signal S2 or the S-shaped curve in the difference signal SD.

As a result, the integrated control unit 11 can calculate the cover distance DM from the top surface 104A of the cover glass 104 to the biological tissue 102 in the pathology glass slide 100 on the basis of the distance between position Z1 and position Z3 of the objective lens 25, regardless of the presence of the bubble BB in the embedding medium 103.

Figure 11:
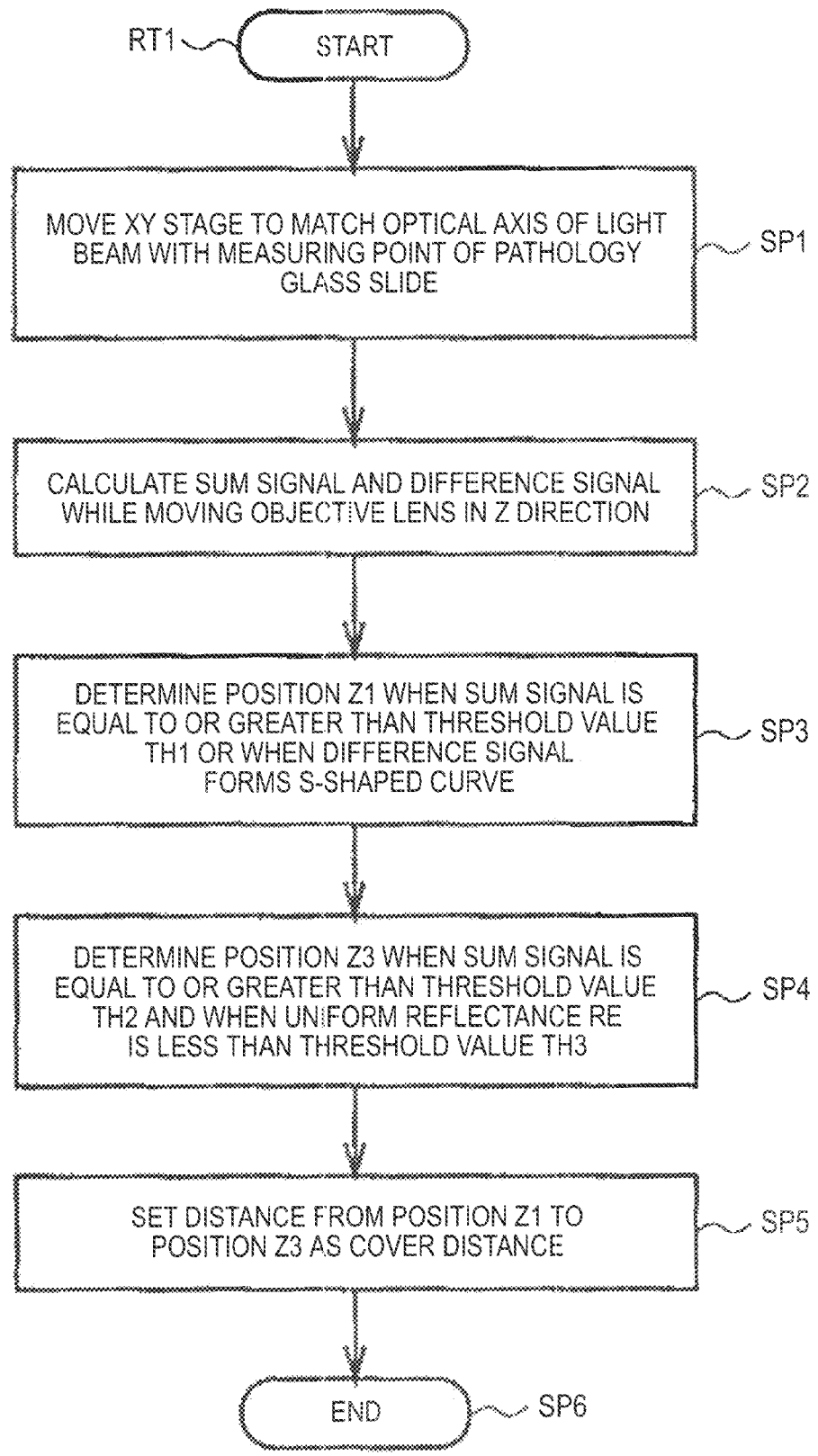
FIG. 11 is a flowchart illustrating the flow of a cover distance calculating process.

Specifically, the integrated control unit 11 performs a cover distance calculating process in accordance with the flowchart shown in FIG. 11.

That is, the integrated control unit 11 performs the cover distance calculating process RT1 in response to an operation instruction from an operator not shown, and performs the process of step SP1.

In step SP1, the integrated control unit 11 moves the movable stage of the XY stage 20 through the use of the driving controller 12 to match the optical axis of the light beam LM with the measuring point QM of the pathology glass slide 100, and then performs the process of step SP2.

In step SP2, the integrated control unit 11 controls the signal processing unit 13 to calculate the sum signal SS and the difference signal SD while controlling the driving controller 12 to move the objective lens 25 in the Z direction through the use of the actuator 26, and then performs the process of step SP3.

In step SP3, the integrated control unit 11 determines the position of the objective lens 25 as position Z1 when the value of the sum signal SS is first greater than the threshold value TH1 or when the difference signal SD forms the S-shaped curve, and then performs the process of step SP4.

At this time, position Z1 is such a position that the focal point FM of the light beam LM is taken on the top surface 104A of the cover glass 104.

In step SP4, the integrated control unit 11 determines the position of the objective lens 25 as position Z3 when the sum signal SS is equal to or greater than the threshold value TH2 and the uniform reflectance RE is less than the threshold value TH3, and then performs the process of step SP5.

In step SP5, the integrated control unit 11 sets the distance from position Z1 to position Z3 as the cover distance DM and then ends the flow of the cover distance calculating process RT1 in step SP6.

Thereafter, the integrated control unit 11 performs the flow of the cover distance calculating process RT1 on plural measuring points QM and correlating the cover distances DM with the information representing the measuring points QM, thereby generating the focus information IF.

1-5. Detection of Presence of Bubble

When a bubble BB is included in the embedding medium 103 of the pathology glass slide 100, the sum signal SS and the difference signal SD form waveforms other than when the bubble BB is not included ((A) and (B) of FIG. 8), as shown in (A) and (B) of FIG. 9.

That is, the sum signal SS forms peaks at the boundary (position Z2) between the bottom surface 104B of the cover glass 104 and the bubble BB and the boundary (position Z3) between the bubble BB and the biological tissue 102 ((A) of FIG. 8 and (A) of FIG. 9), only when the bubble BB is present.

The difference signal SD forms the S-shaped curves at position Z2 and position Z3 ((B) of FIG. 8 and (B) of FIG. 9), only when the bubble BB is present.

Therefore, the integrated control unit 11 determines that the bubble BB is present at the measuring point QM when Condition 1 to Condition 3 described below are all satisfied.

[Condition 1] The sum signal SS forms a peak to some extent at position ZB other than position Z1.

[Condition 2] Position ZB is away from position Z1 by the thickness of the cover glass 104 or more.

[Condition 3] The difference signal SD forms the S-shaped curve at position ZB.

Figure 12:
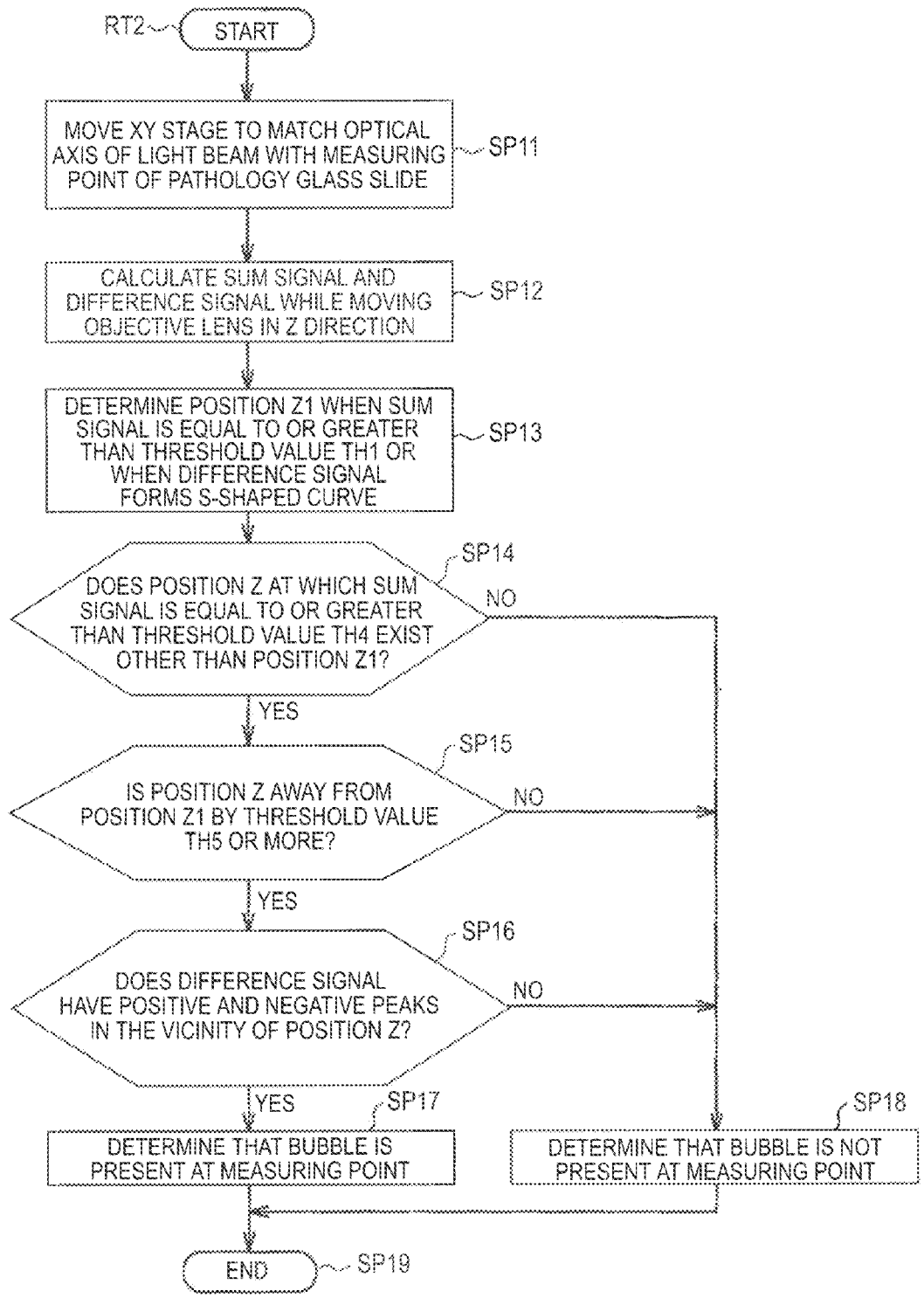
FIG. 12 is a flowchart illustrating the flow of a bubble determining process.

Specifically, the integrated control unit 11 performs a bubble determining process in accordance with the flowchart shown in FIG. 12.

That is, the integrated control unit 11 starts the flow of the bubble determining process RT2 in response to an operation instruction from an operator not shown, and then performs the process of step SP11.

In step SP11, the integrated control unit 11 moves the movable stage of the XY stage 20 through the use of the driving controller 12 to match the optical axis of the light beam LM with the measuring point QM of the pathology glass slide 100, and then performs the process of step SP12.

In step SP12, the integrated control unit 11 controls the signal processing unit 13 to calculate the sum signal SS and the difference signal SD while controlling the driving controller 12 to move the objective lens 25 in the Z direction through the use of the actuator 26, and then performs the process of step SP13.

In step SP13, the integrated control unit 11 determines the position of the objective lens 25 as position Z1 when the value of the sum signal SS is first greater than the threshold value TH1 or when the difference signal SD forms the S-shaped curve. The integrated control unit 11 sets the value of the sum signal SS at this time as a sum signal value SS1 and then performs the process of step SP14.

In step SP14, the integrated control unit 11 determines whether position Z (hereinafter, referred to as position ZB) at which the value of the sum signal SS is equal to or greater than a predetermined threshold value TH4 (where the threshold value TH4 is a quarter of the sum signal value SS1) is present other than position Z1. Here, when the determination result is affirmative, it means that Condition 1 is satisfied, and the integrated control unit 11 then performs the process of step SP15.

In step SP15, the integrated control unit 11 determines whether the distance from position Z1 to position ZB is equal to or greater than a threshold value TH5 (where the threshold value TH5 is the same as the thickness of the cover glass 104, that is, about 0.12 [mm]). When the determination result is affirmative, it means that Condition 2 is satisfied, and the integrated control unit 11 then performs the process of step SP16.

In step SP16, the integrated control unit 11 determines whether positive and negative peaks, that is, an S-shaped curve, are formed in the vicinity of position ZB. When the determination result is affirmative, it means that Condition 3 is satisfied, and the integrated control unit 11 then performs the process of step SP17.

In step SP17, the integrated control unit 11 determines that a bubble BB is present at the measuring point QM, and ends the flow of the bubble determining process RT2 in step SP19.

On the other hand, when the determination result of step SP14, SP15, or SP16 is negative, it means that at least one of Conditions 1 to 3 is not satisfied and that position ZB is not the boundary between the bubble BB and the cover glass 104 or the biological tissue 102. At this time, the integrated control unit 11 performs the process of step SP18.

In step SP18, the integrated control unit 11 determines that a bubble BB is not present at the measuring point QM, and ends the flow of the bubble determining process RT2 in step SP19.

The integrated control unit 11 performs the flow of the bubble determining process RT2 on plural measuring points QM and correlates the information representing the presence of the bubble BB with the information representing the corresponding measuring point QM, thereby generating bubble information IB.

Figure 13:
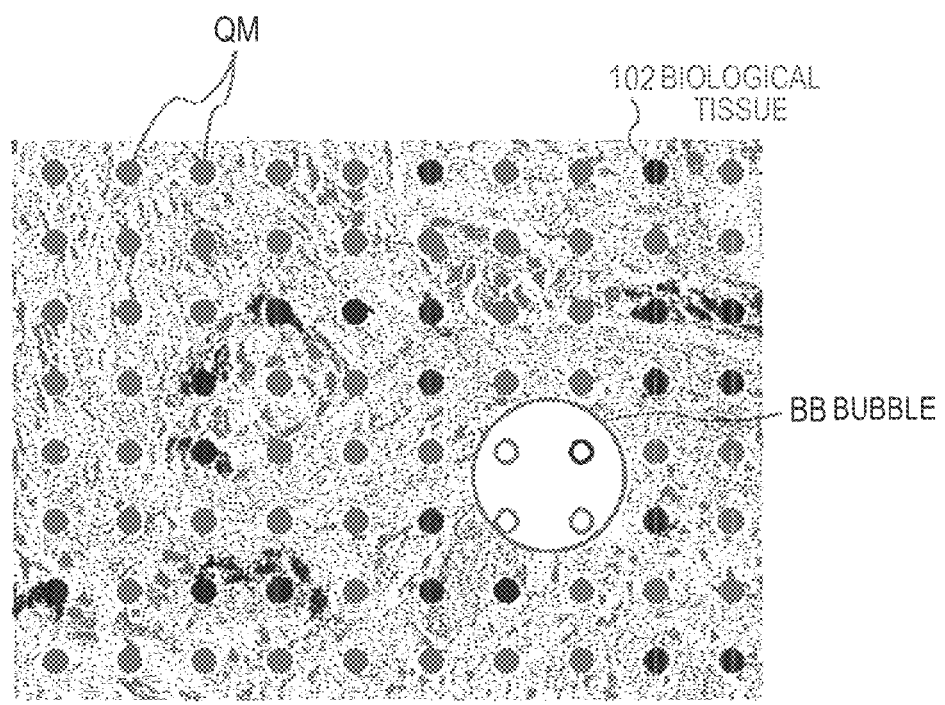
FIG. 13 is a diagram schematically illustrating the presence or absence of a bubble for each measuring point using bubble information.

For example, as shown in FIG. 13, the bubble information IB is information that can be used to specify the position of the bubble BB in the pathology glass slide 100. In FIG. 13, the position at which a bubble BB is not present is indicated by a black circular mark and the position at which a bubble BB is present is indicated by a white circular mark.

In this way, the integrated control unit 11 determines whether a bubble BB is present at each measuring point QM on the basis of the sum signal SS and the difference signal SD, and generates the bubble information IB on the basis of the determination result.

1-6. Operation and Effect

According to the above-mentioned configuration, the focus information generating device 2 receives the first reflected light beam Lr1 obtained by splitting a part of the reflected light beam Lr through the use of the first light receiver 33 to generate the first light-reception signals S1A to S1D while moving the objective lens 25 in the Z direction relative to an arbitrary measuring point QM.

In addition, the focus information generating device 2 condenses the second reflected light beam Lr2 obtained by splitting a part of the reflected light beam Lr, passes the second reflected light beam through the through-hole 36H of the pin-hole plate 36, receives the second reflected light beam through the use of the second light receiver 39, and generates the second light-reception signal S2.

In the focus information generating device 2, the signal processing unit 13 calculates the sum signal SS and the difference signal SD through the use of Expressions 1 and 2 on the basis of the first light-reception signals S1A to S1D, and calculates the uniform reflectance RE through the use of Expression 3 and the second light-reception signal S2.

The integrated control unit 11 determines that the focal point FM of the light beam LM is located on the top surface 104A of the cover glass 104 when the sum signal SS is first greater than the threshold value TH1 or when the difference signal SD forms the S-shaped curve, and sets the position of the objective lens 25 at this time as position Z1.

The integrated control unit 11 determines that the focal point FM of the light beam LM is located in the biological tissue 102 when the sum signal SS is greater than the predetermined threshold value TH2 and the uniform reflectance RE is smaller than the predetermined threshold value TH3, and sets the position of the objective lens 25 at this time as position Z3.

Therefore, the integrated control unit 11 can calculate the cover distance DM from the top surface 104A of the cover glass 104 to the biological tissue 102 in the pathology glass slide 100 on the basis of positions Z1 and Z3.

Here, when a bubble BB is included in the embedding medium 103, the reflectance at the boundary between the bubble BB and the cover glass 104 or the biological tissue 102 is relatively high. Accordingly, the values of the sum signal SS and the difference signals SD form a peak and an S-shaped curve ((A) and (B) of FIG. 9), which do not appear when the bubble BB is not included.

On the other hand, in the pathology glass slide 100, a part of the light beam LM is irregularly reflected only in the biological tissue 102 and most thereof is not irregularly reflected by the other boundaries and the like. Accordingly, in the focus information generating device 2, only when the focal point of the light beam LM is located in the biological tissue 102, the amount of light of the second reflected light beam Lr2 from which the irregularly-reflected components are removed by the irregularly-reflected component removing unit 34 is smaller than the amount of light of the first reflected light beam Lr1.

Therefore, the integrated control unit 11 can satisfactorily detect that the focal point FM of the light beam LM is located in the biological tissue 102, that is, that the objective lens 25 is located at position Z3, by using the uniform reflectance RE, which represents the ratio of the second signal to the sum signal SS, as a determination indicator.

The focus information generating device 2 generates the focus information IF by correlating the information representing the measuring points QM with the cover distance DM, and supplies the generated focus information to the imaging device 3. Accordingly, the imaging device 3 can take the focus of the objective lens in the biological tissue 102 using the focus information IF without performing a particular focal point detecting process for each measuring point QM.

Particularly, when the imaging device 3 employs a CMOS (Complementary Metal Oxide Semiconductor) image sensor, the speed of reading image data from pixels is relatively low. Accordingly, when a focus adjusting process is performed using the image data, it takes much time to perform the focus adjusting process.

When the imaging device 3 takes an image, for example, using an objective lens with NA of 0.8, the depth of focus is about 1 [μm], which is very short. Accordingly, it is preferable that the imaging device 3 measures the cover distance DM using an actual pathology glass slide 100 so as to generate an image obtained by taking the focus of the objective lens on the biological tissue 102.

In the imaging system 1, the focus information generating device 2 generates the focus information IF in advance using the actual pathology glass slide 100. Accordingly, in the imaging device 3 of the imaging system 1, it is possible to satisfactorily take the focus of the objective lens on the biological tissue 102 in the pathology glass slide 100 without depending on the speed of reading image data.

At this time, since the cover distance DM for each measuring point QM is known, the imaging device 3 can generate the cover distance DC for the imaging point QC on the basis of the cover distance DM and then can take the focus of the objective lens on the biological tissue 102 in a short time. Accordingly, the imaging device 3 can greatly shorten the time necessary for performing the imaging process on all the imaging points QC in a single pathology glass slide 100.

The integrated control unit 11 determines whether a bubble BB is present at a measuring point QM, by performing a series of processes in the flow of the bubble determining process RT2 (FIG. 12).

The integrated control unit 11 determines that the bubble BB is present, only when the sum signal SS forms a certain peak at position ZB away from position Z1 by the thickness of the cover glass 104 or more and the difference signal SD forms the S-shaped curve. The integrated control unit 11 generates the bubble information IB by correlating the information representing the presence of the bubble BB with the information representing the corresponding measuring point QM, and supplies the generated bubble information to the imaging device 3.

At this time, the integrated control unit 11 can greatly reduce the possibility of erroneously determining the presence of the bubble BB by using the combination of three types of Conditions 1 to 3.

Since the sum signal SS and the difference signal SD used to generate the focus information IF can also be used to generate the bubble information IB, the integrated control unit 11 does not have to generate any particularly signal.

Accordingly, the imaging device 3 can know at what measuring point QM a bubble BB is present on the basis of the bubble information IB before taking an image.

Air in the bubble BB and the embedding medium 103 are generally different from each other in refractive index. Accordingly, when a bubble BB is present, light is refracted at the boundary between the bottom surface 104B of the cover glass 104 and the bubble BB.

That is, when a bubble BB is present and the position of the objective lens is adjusted on the basis of the cover distance DM in the same way as when the bubble BB is not present, the image taken by the imaging device 3 is out of focus, that is, blurred.

Therefore, the imaging device 3 can take appropriate measures such as correcting the position of the objective lens depending on the bubble BB for the imaging point QC at which a bubble BB is included in the imaging range AC on the basis of the bubble information IB.

For example, when a bubble BB is present at too many measuring points QM, the imaging device 3 can determine that the pathology glass slide 100 is failure on the basis of the bubble information IB and can replace it with another pathology glass slide 100 to take an image.

In this way, the imaging device 3 can take appropriate measured for the bubble BB on the basis of the bubble information IB.

According to the above-mentioned configuration, the focus information generating device 2 receives the first reflected light beam Lr1 split from the reflected light beam Lr and the second reflected light beam Lr2 passing through the through-hole 36H of the pin-hole plate 36. The signal processing unit 13 calculates the uniform reflectance RE representing the light amount ratio of the second reflected light beam Lr2 to the first reflected light beam Lr1 in addition to the sum signal SS and the difference signal SD. The integrated control unit 11 detects position Z1 corresponding to the top surface 104A of the cover glass 104 on the basis of the sum signal SS or the difference signal SD, and detects position Z3 corresponding to the biological tissue 102 on the basis of the sum signal SS and the uniform reflectance RE. As a result, the integrated control unit 11 can calculate the cover distance DM from the top surface 104A of the cover glass 104 to the biological tissue 102 in the pathology glass slide 100 on the basis of positions Z1 and Z3.

2. Other Embodiments

In the above-mentioned embodiment, both the focus information IF representing the cover distance DM and the bubble information IB representing the presence of a bubble BB are generated by the focus information generating device 2.

The invention is not limited to this configuration, but the focus information generating device 2 may generate only the focus information IF, for example, when the bubble information IB is not necessary for the imaging device 3.

In the above-mentioned embodiment, the irregularly-reflected component removing unit 34 includes the condensing lens 35, the pin-hole plate 36, and the collimator lens 37 and removes the irregularly-reflected components included in the second reflected light beam Lr2.

The invention is not limited to this configuration, but the irregularly-reflected component removing unit may include other optical elements or combinations thereof to remove the irregularly-reflected components included in the second reflected light beam Lr2.

Figure 14:
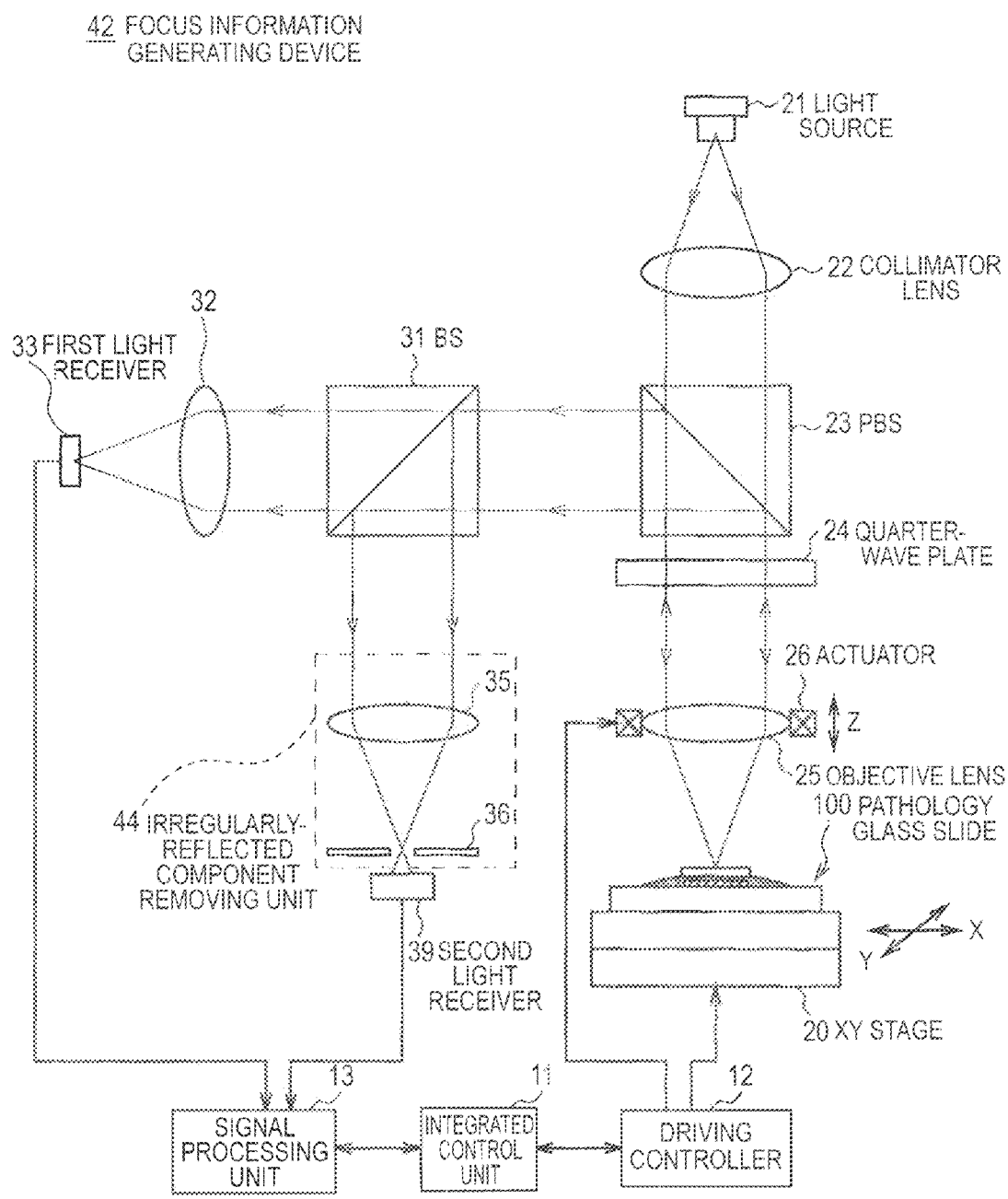
FIG. 14 is a diagram schematically illustrating the configuration of a focus information generating device according to another embodiment of the invention.

For example, as shown in FIG. 14 in which the same elements as shown in FIG. 6 are referenced by the same reference signs, a focus information generating device 42 is different from the focus information generating device 2, in that an irregularly-reflected component removing unit 44 is provided instead of the irregularly-reflected component removing unit and the condensing lens 38 is removed. The irregularly-reflected component removing unit 44 does not include the collimator lens 37 of the irregularly-reflected component removing unit 34 and the second light receiver 39 is disposed very close to the pin-hole plate 36.

The irregularly-reflected component removing unit 44 having this configuration can remove the irregularly-reflected components included in the second reflected light beam Lr2, similarly to the irregularly-reflected component removing unit 34, and can give the same function as the condensing lens 38 to the condensing lens 35. Accordingly, the focus information generating device 42 can be more simplified in configuration than the focus information generating device 2.

In the above-mentioned embodiment, the position satisfying the condition that the uniform reflectance RE representing the ratio of the second light-reception signal S2 to the sum signal SS is less than the threshold value TH3 is determined as position Z3 at the time of calculating the cover distance DM.

The invention is not limited to this configuration, but position Z3 may be determined on the basis of various conditions in the sum signal SS and the second light-reception signal S2, such as a condition that the difference between the sum signal SS and the second light-reception signal S2 is equal to or greater than a predetermined threshold value. In this case, it is preferable that position Z3 is determined using the condition that scattered light is blocked by the pin-hole plate 36 and the value of the second light-reception signal S2 is smaller than the value of the sum signal SS.

In the above-mentioned embodiment, the reflected light beam Lr is split into the first reflected light beam Lr1 and the second reflected light beam Lr2 having almost the same amount of light by the use of the beam splitter 31.

The invention is not limited to this configuration, but the reflected light beam Lr may be split into a first reflected light beam Lr1 and a second reflected light beam Lr2 having different amounts of light by the use of the beam splitter 31.

In this case, it is preferable that the uniform reflectance RE is multiplied by coefficients or the threshold value TH3 is adjusted depending on the split ratio of the first reflected light beam Lr1 and the second reflected light beam Lr2.

In the above-mentioned embodiment, the position satisfying the condition that the sum signal SS is equal to or greater than the threshold value TH2 or the condition that the difference signal SD forms the S-shaped curve is determined as position Z1 in step SP3 of the cover distance calculating process RT1 and step SP13 of the bubble determining process RT2.

The invention is not limited to this configuration, but position Z1 may be detected on the basis of another condition or plural conditions such as a condition that the sum signal SS is equal to or greater than the threshold value TH2 and the difference signal SD forms the S-shaped curve.

In the above-mentioned embodiment, the cover distance DM is calculated using the top surface 104A of the cover glass 104 as the reference point.

The invention is not limited to this configuration, but the cover distance DM may be calculated using various positions in the pathology glass slide 100 such as the bottom surface of the glass slide 101 as the reference point.

In the above-mentioned embodiment, the objective lens 25 is moved in the Z direction through the use of the actuator 26 and the XY stage 20 is not moved in the Z direction.

The invention is not limited to this configuration, but the objective lens 25 may be fixed and the movable stage 20A of the XY stage 20 may be moved in the Z direction (that is, an XYZ stage is employed). The relative position of the focal point FM of the light beam LM to the pathology glass slide 100 has only to be moved in the Z direction.

In the above-mentioned embodiment, it is determined that a bubble BB is present when Conditions 1 to 3 are all satisfied in the bubble determining process RT2 (FIG. 12).

The invention is not limited to this configuration, but it may be determined that a bubble BB is present when at least one of Conditions 1 to 3 is satisfied, for example, when Condition 3 (the difference signal SD forms the S-shaped curve at position ZB) is not used and only Conditions 1 and 2 are used.

In the above-mentioned embodiment, plural imaging points QC are set in the pathology glass slide 100 (FIG. 13). The invention is not limited to this configuration, but only one imaging point QC may be set, for example, when the imaging device 3 can take an image of the overall imaging range of the biological tissue 102 through the use of one imaging process. The measuring points QM have only to be arranged at an interval equal to or less than the imaging points QC.

In the above-mentioned embodiment, the biological tissue 102 is used as an imaging target. The invention is not limited to this configuration, but various other objects may be used as the imaging target. In this case, the imaging target has only to have a property of irregularly reflecting a part of a light beam LM. Accordingly, the focus information generating device 2 can detect position Z3 on the basis of the uniform reflectance RE.

In the above-mentioned embodiment, the focus information generating device 2 as the focus information generating device is constructed by the objective lens 25 as the objective lens, the XY stage 20 as the setting stage, the actuator 26 and the driving controller 12 as the distance adjusting unit, the beam splitter 31 as the splitting unit, the first light receiver as the first light-receiving unit, the irregularly-reflected component removing unit 34 as the irregularly-reflected component removing unit, the second light receiver 39 as the second light-receiving unit, and the signal processing unit 13 and the integrated control unit 11 as the focus information generating unit.

The invention is not limited to this configuration, but the focus information generating device may be constructed by an objective lens, a setting stage, a distance adjusting unit, a splitting unit, a first light receiver, an irregularly-reflected component removing unit, a second light receiver, and a focus information generating unit having various different configurations.

INDUSTRIAL APPLICABILITY

The invention can be applied to an imaging system imaging various objects having a property of irregularly reflecting light.

REFERENCE SIGNS LIST

1: IMAGING SYSTEM
2: FOCUS INFORMATION GENERATING DEVICE

3: IMAGING DEVICE
11: INTEGRATED CONTROL UNIT
12: DRIVING CONTROLLER
13: SIGNAL PROCESSING UNIT
20: XY STAGE
21: LIGHT SOURCE
25: OBJECTIVE LENS
26: ACTUATOR
31: BEAM SPLITTER
33: FIRST LIGHT RECEIVER
34: IRREGULAR-REFLECTED COMPONENT REMOVING UNIT
35: CONDENSING LENS
36: PIN-HOLE PLATE
39: SECOND LIGHT RECEIVER
100: PATHOLOGY GLASS SLIDE
101: GLASS SLIDE
102: BIOLOGICAL TISSUE
103: EMBEDDING MEDIUM
104: COVER GLASS
QM: MEASURING POINT
QC: IMAGING POINT
BB: BUBBLE
LM: LIGHT BEAM
Lr: REFLECTED LIGHT BEAM
Lr1: FIRST REFLECTED LIGHT BEAM
Lr2: SECOND REFLECTED LIGHT BEAM
FM: FOCAL POINT
S1A~S1D: FIRST LIGHT-RECEPTION SIGNAL
SS: SUM SIGNAL
SD: DIFFERENCE SIGNAL
S2: SECOND LIGHT-RECEPTION SIGNAL
RE: UNIFORM REFLECTANCE

The invention claimed is:

1. A focus information generating device comprising:
an objective lens that condenses a light beam on a focal point;
a focal point shifting unit that shifts the focal point in an optical axis direction of the light beam relative to a pathology glass slide in which a sliced biological tissue is placed on a setting surface of a glass slide and the biological tissue is covered with an embedding medium and a cover glass;
a splitting unit that splits a reflected light beam, which is obtained by reflecting the light beam from the pathology glass slide, into a first reflected light beam and a second reflected light beam;
a first light-receiving unit that receives the first reflected light beam and generates a first light-reception signal;
an irregularly-reflected component removing unit that removes an irregularly-reflected component included in the second reflected light beam;
a second light-receiving unit that receives the second reflected light beam passing through the irregularly-reflected component removing unit and generates a second light-reception signal; and
a focus information generating unit that calculates a cover distance from a predetermined reference point set on the pathology glass slide to the biological tissue on the basis of the first light-reception signal and the second light-reception signal when the focal point is shifted by the focal position adjusting unit and generates focus information of the pathology glass slide on the basis of the cover distance.

2. The focus information generating device according to claim 1, wherein the focus information generating unit determines whether the focal point is taken on the reference point and the biological tissue on the basis of the first light-reception signal and the second light-reception signal and sets the shifted distance of the focal point between the reference point and the biological tissue as the cover distance.

3. The focus information generating device according to claim 2, wherein the focus information generating unit determines whether the focal point is taken on the biological tissue on the basis of a ratio of the second light-reception signal to the first light-reception signal.

4. The focus information generating device according to claim 3, wherein the focus information generating unit determines that the focal point is taken on the biological tissue when an amount of light received by the first light-receiving unit is equal to or greater than a predetermined threshold value and the ratio of the second light-reception signal to the first light-reception signal is equal to or less than a predetermined threshold value.

5. The focus information generating device according to claim 2, wherein the focus information generating unit sets the surface of the cover glass as the reference point and determines that the focal point is taken on the surface of the cover glass when the amount of light received by the first light-receiving unit is equal to or greater than a predetermined threshold value.

6. The focus information generating device according to claim 2, further comprising a multi lens that gives astigmatism to the first reflected light beam,
wherein the first light-receiving unit is divided into four light-receiving areas in a lattice pattern, generates a light-reception signal for each of the light-receiving areas, and sets the total sum of the light-reception signals as the first light-reception signal, and
wherein the focus information generating unit sets the surface of the cover glass as the reference point and determines whether the focal point is taken on the surface of the cover glass on the basis of a diagonal difference value which is a difference value between the sums of the light-reception signals from two sets of light-receiving areas located at diagonal positions in the first light-receiving unit.

7. The focus information generating device according to claim 1, wherein the irregularly-reflected component removing unit includes
a condensing lens that condenses the second reflected light beam, and
a pin-hole plate that passes a part in the vicinity of the focal point of the second reflected light beam condensed by the condensing lens.

8. The focus information generating device according to claim 1, further comprising a moving mechanism that moves the pathology glass slide in an in-plane direction substantially parallel to at least the setting surface of the glass slide so that the optical axis of the light beam is matched with a predetermined measuring point in the biological tissue,
wherein the focus information generating unit generates the focus information by correlating information representing the measuring point with the cover distance.

9. The focus information generating device according to claim 1, further comprising a bubble information generating unit that determines whether a bubble is present in the embedding medium on the basis of the first light-reception signal when the focal point is shifted by the focal position adjusting unit and that generates bubble information at an application position of the light beam on the basis of the determination result.

10. The focus information generating device according to claim 9, wherein the focus information generating unit sets the surface of the cover glass as the reference point, and wherein the bubble information generating unit determines that a bubble is present when the value of the first light-reception signal at a position other than the reference point is equal to or greater than a predetermined ratio to the value at the reference point.

11. The focus information generating device according to claim 8, wherein the bubble information generating unit determines that a bubble is present when the value of the first light-reception signal at a position away from the reference point by a distance or greater corresponding to the thickness of the cover glass is equal to or greater than a predetermined ratio to the value at the reference point.

12. The focus information generating device according to claim 9, wherein the first condensing lens gives astigmatism to the first reflected light beam, wherein the first light-receiving unit is split into four light-receiving areas in a lattice pattern, generates a light-reception signal for each of the light-receiving areas, and sets the total sum of the light-reception signals as the first light-reception signal, wherein the focus information generating unit sets the surface of the cover glass as the reference point, and wherein the bubble information generating unit determines that a bubble is present when a diagonal difference value, which is a difference between the sums of the light-reception signals in two sets of light-reception areas located at diagonal positions in the first light-receiving unit, at a position away from the reference point by a distance or greater corresponding to the thickness of the cover glass has a maximum value and a minimum value.

13. The focus information generating device according to claim 1, wherein the focal point shifting unit moves at least one of a stage holding the pathology glass slide and the objective lens as a movement target in the optical axis direction, and wherein the focus information generating unit recognizes the position of the focal point on the basis of the position of the movement target in the optical axis direction.

14. A focus information generating method comprising:

a shifting step of shifting a focal point of an objective lens, which condenses a light beam, in an optical axis direction of the light beam relative to a pathology glass slide in which a sliced biological tissue is placed on a setting surface of a glass slide and the biological tissue is covered with an embedding medium and a cover glass;

a splitting step of splitting a reflected light beam, which is obtained by reflecting the light beam from the pathology glass slide, into a first reflected light beam and a second reflected light beam;

a first light receiving step of receiving the first reflected light beam and generating a first light-reception signal;

a second light receiving step of removing an irregularly-reflected component from the second reflected light beam, receiving the second reflected light beam, and generating a second light-reception signal;

a cover distance calculating step of calculating a cover distance from a predetermined reference point set on the pathology glass slide to the biological tissue on the basis of the first light-reception signal and the second light-reception signal when the focal point is shifted; and a focus information generating step of generating focus information of the pathology glass slide on the basis of the cover distance.

* * * * *